April 21, 1953            F. J. SALZER            2,636,111
ENCLOSED SWINGING CONCEALED HEAD LAMP
Filed June 9, 1949            2 SHEETS—SHEET 1
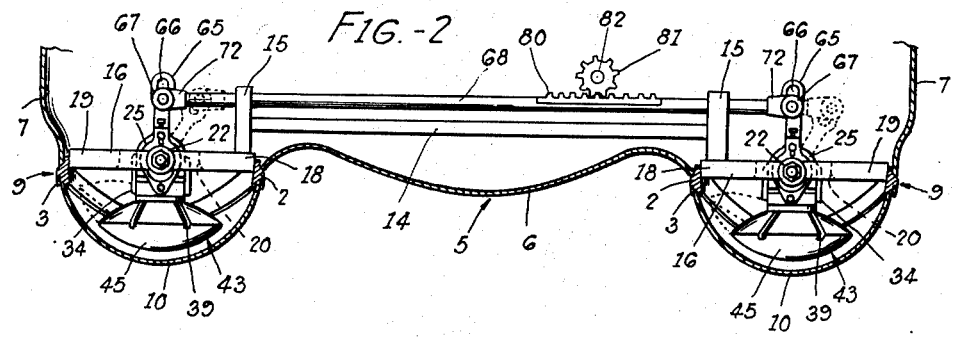
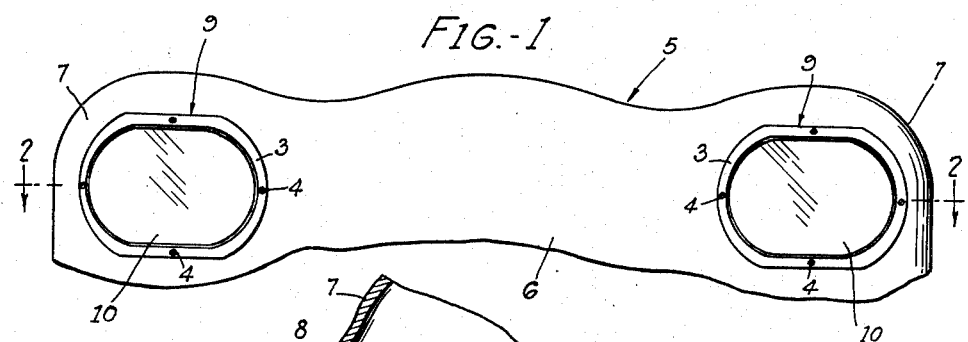
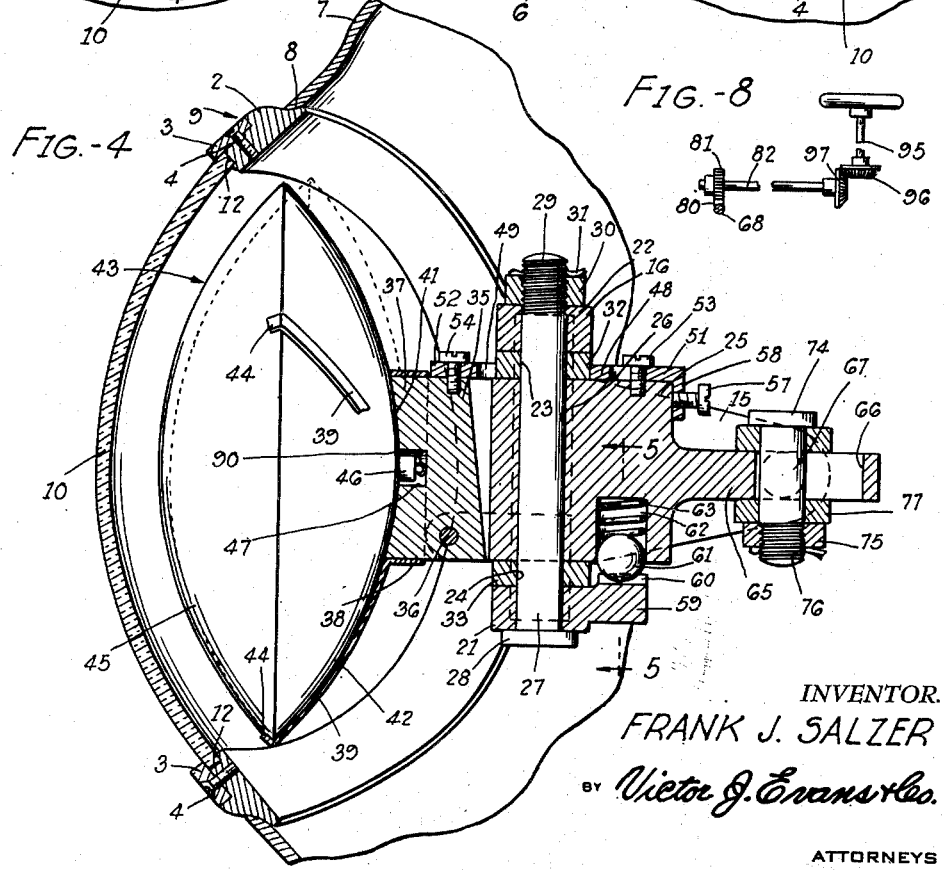
INVENTOR.
FRANK J. SALZER
BY Victor J. Evans & Co.
ATTORNEYS

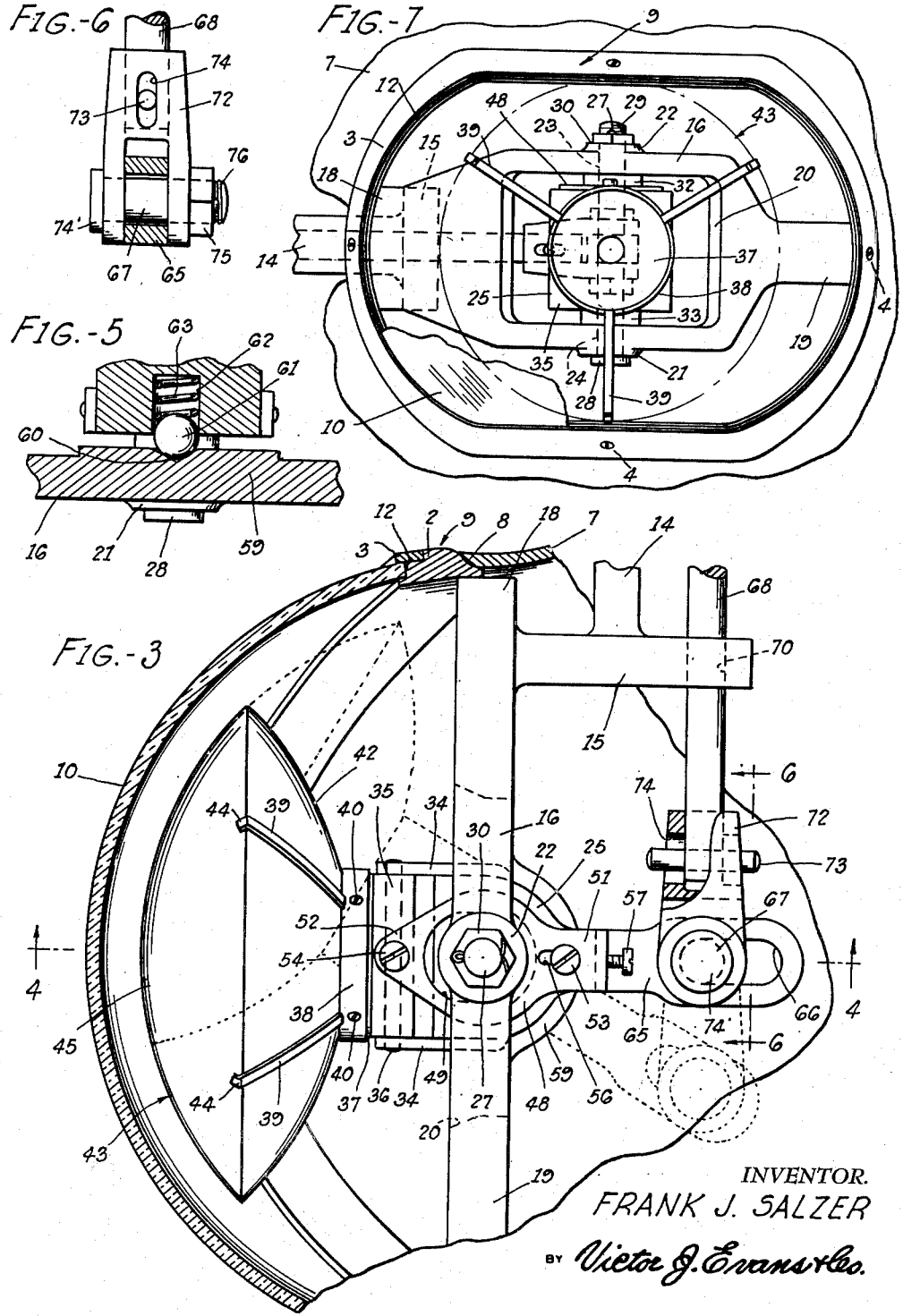

Patented Apr. 21, 1953

2,636,111

UNITED STATES PATENT OFFICE 2,636,111

ENCLOSED SWINGING CONCEALED HEAD LAMP

Frank J. Salzer, Chicago, Ill.

Application June 9, 1949, Serial No. 97,999

1 Claim. (Cl. 240—62.51)

The present invention relates to improvements in motor vehicle illumination, and more particularly to swinging concealed headlamps which are adapted to be angularly displaced in the direction of vehicle turning to illuminate the roadway while negotiating turns and curves.

One object of the invention is to provide a pair of horizontally swinging reflector-lens units movably mounted in back of a stationary lens having the same arc of curvature as the lens of said lens reflector unit such that the reflected beam will be uniformly modified to obtain maximum illumination throughout the various positions of horizontal angular displacement.

Another object is to provide a pair of headlamps for motor vehicles to illuminate the roadway in the direction of turning, and in which the reflector-lens illuminating units are mounted to swing horizontally about a fixed vertical pivot and to provide means independent of said pivot axis for adjusting the tilt or elevation of the headlight beam so that the beam will not rise and fall when swung through a complete arc in back of the headlight casing.

Another object is to provide a pair of swinging concealed headlamps or lens-reflector illuminating units having rockably mounted supporting blocks to facilitate adjustment thereof about a horizontal pivot axis to enable the headlamp beam to be raised or lowered and adjusted to conform to the requirements of the traffic laws.

Another object is to provide a pair of headlamps for a motor vehicle each of which includes a sealed-beam illuminating unit consisting of a unitary lens-reflector unit mounted on a swinging block in back of a window opening in the fender apron of the vehicle, and to provide a spherical lens for enclosing the sealed-beam lens reflector unit to conceal the same and exclude rain, snow and inclement weather conditions.

Another object is to provide a pair of headlamps for motor vehicles which includes a pair of sealed-beam lens-reflector units swingably mounted rearwardly of a transparent window in the fender apron of the vehicle and connected together to move in unison in a direction corresponding to the direction of vehicle turning and to provide means for permitting movement of the steering apparatus to displace the steering wheels angularly at an approximate distance of 5 degrees in both directions of steering movement without changing the angular position of the sealed-beam lens-reflector unit from its normal position.

Another object is to provide illuminating headlamps for motor vehicles of the above mentioned type in which means is provided for centering the sealed-beam headlight units when returning to a straight ahead position and to provide means for automatically shifting said headlamps to their centered straight ahead position when being returned after a curve or turn has been negotiated by the steering apparatus of the vehicle.

Other objects and advantages of the invention will become apparent during the course of the following description of the accompanying drawings wherein:

Figure 1 is a fragmentary front elevational view of a motor vehicle illustrating the manner in which the spherical lenses are arranged in the fender aprons thereof.

Figure 2 is a horizontal cross-sectional view taken on line 2—2 of Figure 1 and looking in the direction of the arrows to illustrate the manner in which the sealed-beam lens-reflector units are mounted to swing horizontally about a vertical pivot axis.

Figure 3 is an enlarged fragmentary cross-sectional view of the fender structure and spherical lens to illustrate the sealed-beam lens-reflector illuminating unit supporting structure in top elevation. Parts of the supporting structure being broken away to illustrate various details of construction.

Figure 4 is a vertical cross sectional view through one of the headlamp units taken on line 4—4 of Figure 3 and illustrating the manner in which the sealed-beam reflector lens illuminating unit can be tilted about a horizontal pivot axis to control the elevation of the roadway illuminating beam.

Figure 5 is a vertical cross-sectional fragmentary view taken on the line 5—5 of Figure 4 and looking in the direction of the arrows to illustrate the yielding spring press detent ball for shifting the sealed-beam lens-reflector illuminating unit to its centered straight forward position when approaching said straight forward position after a turn or curve has been negotiated;

Figure 6 is a fragmentary cross-sectional view taken on line 6—6 of Figure 3 illustrating the lost motion pin and slot connection between the actuator rod to permit slight angular steering movement to the right or left without controlling the sealed-beam lens-reflector illuminating means;

Figure 7 is a front elevational view showing a fragmentary portion of one of the fenders and one of the headlamps supporting structures with the lens-reflector unit removed; and Figure 8 is a diagrammatic view illustrating the connection between the vehicle steering head and the rod.

In the drawings, and more in detail, there is shown for the purpose of convenience of illustration the front of a motor vehicle generally designated 5 having a radiator apron 6 and streamlined fenders 7. The front fenders 7 are provided with openings 8 (Figs. 3 and 4) in which is fitted an ovate frame or body member 9. The frame or body member 9 includes a base 2 which is secured to the fenders 7, and a bracket 3 coacts with base 2 to hold therebetween a lens 10. Screws 4 maintain these parts in assembled relation. The arc of the spherical lens 10 is generated from the same radius as the horizontally swinging lens-reflector unit which will be described herein more fully. The lenses 10 are identical for the right and left hand fenders 7 of the motor vehicle 5, and said lenses are of somewhat hemispherical shape in horizontal section, as well as vertical section, and are constructed to fit the contour of the fenders 7 so that the edges thereof will be received in a recess 12 in the frames 9.

Extending between the frames 9 and rearwardly of the radiator apron 6 is a transverse bar 14 which is provided at its ends with laterally extending projections 15 (Fig. 2), and the projections 15 are connected to frame members 16 which are formed of suitable castings and may, if desired, be integrated with the extensions 15. The rectangular frames 16 are provided adjacent the projection 15 with arcuately curved portions 18 (Fig. 7) which are adapted to engage the diametral portions of the lens frame 9 and be secured thereto by welding or suitable threaded fasteners. Each of the frames 16 are also provided with extensions 19 which engage the opposite diametral portion of each of the frames 9 and may likewise be held in place by welding or suitable threaded fasteners (not shown).

Since each of the headlight structures are identical in construction, a description of one will suffice for both. The frame 16 is provided with a central opening 20 (Fig. 7) having opposed bearing bosses 21 and 22 provided with aligned bearing openings 23 and 24 respectively. A block 25 is mounted between the horizontal arms of said frame 16, and is provided with a vertical opening 26 for receiving a pivot pin 27. The lower end of the pivot pin is provided with an enlarged head 28 which engages the bearing boss 21 on the lower arm of the frame 16, and the upper end is threaded as at 29 for receiving a correspondingly threaded retaining nut 30. A cotter key 31 is passed through a transverse opening in the threaded portion of the bolt 27 to secure the nut in place. Suitable washers 32 and 33 are interposed between the head or top end of the frame 16 and the swinging block 25, as well as between the lower leg of said block, respectively. Formed integral with said block 25 is a pair of forwardly extending projections 34 between which is rockably mounted a lens-reflector supporting block 35 on a horizontal pivot pin 36. The lens-reflector supporting block 35 is of substantially square section and is provided with a forwardly extending portion 37 of round section to accommodate a clamping ring 38 having radially extending spider arms 39. The clamping ring 38 is held in place by circumferentially spaced set screws or the like 40. The outer face of the round projection 37 is concave as at 41 to conform to the parabolic shape of a reflector 42 of a sealed-beam headlamp generally designated 43. The outer ends of the spider arms as at 44 are angularly bent to grip the edge of the reflector of said sealed-beam illuminating unit 43, and the lens 45 of said unit is formed integral with the reflector 42. In sealed-beam headlamps the reflector portion 42 is formed of glass suitably silvered to provide a mirrored surface, and the lens portion 45 is likewise of glass and is integrated at its peripheral edge with the reflector portion 42. A socket member 46 is carried by the reflector portion and is received in a round recess 47 extending inwardly from the concave face 41 of the supporting block 35. It is to be noted, that the radii of the lens 10 and lens 45 are of a different length and emanate from the same central point which both horizontally and vertically are generated on an arc adjacent the transverse and longitudinal center point of the pin 27.

Mounted on the top of the block 25 and beneath the top leg or arm of the frame 16 is an adjusting plate 48 which is provided with a central opening 49 for encircling the washer 32 (Fig. 4), and said plate is of ring-like design having opposite projections 51 and 52 (Fig. 3) which are connected to the block 25 and to the rocking block 35 respectively, by means of screws 53 and 54. The screw 54 extends through the tapered projection 52 and the screw 53 passes through a slot 56 in the projection 51 so that by sliding the ring-shaped plate 48 forwardly and rearwardly the block 35 will be rocked about its horizontal pivot axis 36 and cause the reflector-lens illuminating unit 43 to be raised or lowered as indicated by the full and dotted line positions in Figure 4. The angular adjustment is effected by means of a set screw 57 which extends through an angular projection 58 on the circular plate extension 51.

Formed on the lower arm of the frame 16 is a rearwardly extending shelf 59 which is provided with a V-notch 60 for receiving a ball detent 61 which is yieldingly and slidably received in a vertical bore 62 in the horizontally swinging block 25 and is yieldingly urged into the V-notch 60 by means of a coil spring 63.

Formed integral with the horizontally swinging block 25 is a rearwardly extending arm or finger 65 which is provided with an elongated slot 66 for receiving a clevis pin 67. As illustrated in Figure 2, the rearwardly extending arms 65 are adapted to be connected by a horizontal tie rod 68 which is slidably guided in aligned bores 70 of the angular extensions 15 carried by said supporting rod 14. The ends of said rods 68 are fitted with clevis couplings 72 by means of the pin and slot conections 73 and 74, and said clevis is held in place by the bolt or clevis pin 67 which has an enlarged head 74 which engages the top furcation of the clevis 72 while a retaining nut 75 is threaded on the correspondingly threaded end 76 of the clevis bolt 67. The lower furcation 77 extends beneath the rearwardly extending projection 65 as is clearly shown in Figure 4.

The tie rod 68 is provided with a rack portion 80 which is adapted to be engaged by means of a gear wheel 81 which is mounted on a shaft 82, Figures 2 and 8, and the shaft 82 is adapted to be controlled by the steering rod 95, Figure 8. A bevel gear 96 is mounted on an end of the rod 95 and the gear 96 is arranged in meshing engagement with a bevel gear 97 on the adjacent end of the shaft 82. Thus, when the wheels of the vehicle 5 are steered to the right or left, the lens-reflector units 43 will be moved in a corresponding direction, and by reason of the pin and slot connection 73—74 the steering gear may be turned in either direction to displace the steering wheels approximately 5 degrees before the reflector lens illuminating unit 43 will be angularly displaced in a corresponding direction to illuminate the roadway immediately in front of the vehicle while making turns or curves.

Suitable wiring 90 for electrically connecting the socket member 46 with a source of electrical energy (not shown), is provided and a switch or circuit breaker likewise not shown, may be provided for electrically connecting the source of energy to the filament of the lens-reflector illuminating unit 43 to energize the same.

In operation, when the steering gear of the motor vehicle 5 (not shown) is operated to control the steering wheels the gear wheel 81 will be rotated to shift the tie rod 68 in a corresponding direction and thereby swing the reflector lens illuminating units 43 in a corresponding direction about the vertical pivot axis of the pin 27. When the steering wheels are returned to their normal straight forward position, the yielding detent ball 61 will engage the V-notch 60 and cause the reflector-lens illuminating units 43 to move to their centered position under the influence of the spring 63 in advance of the tie rod 68. Thus, the lens-reflector units 43 will return to their normal position slightly in advance of the steering gear and tie rod 68 and will then be held centered by the ball detent 61 even though the steering gear is operated to angularly displace the steering wheels a slight angular distance in either direction of steering.

When it is desired to adjust the horizontal level of the headlight beam, the screws 53 and 54 are loosened, and the adjusting screw 57 is turned until the proper elevation of the lens-reflector unit 43 is attained. It being noted that adjustment of the screw 57 will rock the block 35 about the horizontal pivot axis 36, and since the block 35 solely supports the lens-reflector illuminating unit 43 said unit will be likewise adjusted.

By reason of the fact that the lenses 10 and 45 are of different radii about the same point of arc, the maximum illumination will be attained when the reflector-lens unit 43 approaches the limit of its horizontal angular movement in either direction since the beam from the light source will be modified to the same extent as it passes through all portions of the lenses 10 and 45.

What I claim is:

Dirigible headlights for a motor vehicle, comprising a pair of ovate stationary body members, a hemispherical lens mounted in each of said body members, a transverse bar extending between said pair of body members and having a laterally extending projection on each end thereof, a frame connected to each of said projections and including horizontally disposed arms provided with a central opening, opposed bearing bosses mounted on the top and bottom of said frames and provided with registering apertures, a block mounted between the horizontal arms of each frame and provided with an aperture registering with the apertures in said bearing bosses, a pivot pin extending through said registering apertures, a pair of projections extending forwardly from said block, a lens reflector supporting member pivotally mounted between said pair of projections, a sealed beam unit connected to each of said supporting members, means for adjusting the angular position of the sealed beam units about a horizontal axis, a finger extending rearwardly from each of said blocks, a horizontally disposed tie rod extending between said pair of fingers and pivotally connected thereto, a rack portion mounted on said tie rod, and a gear wheel meshing with said rack portion and adapted to be operated by a steering wheel.

FRANK J. SALZER.

References Cited in the file of this patent

UNITED STATES PATENTS

| Number | Name | Date |
| --- | --- | --- |
| 1,241,410 | McLean et al. | Sept. 25, 1917 |
| 1,765,813 | Witter | June 24, 1930 |
| 2,434,766 | Herrington | Jan. 20, 1948 |
| 2,512,817 | Thompson | June 27, 1950 |

FOREIGN PATENTS

| Number | Country | Date |
| --- | --- | --- |
| 350,741 | Italy | July 21, 1937 |